United States Patent
Ikegaya

(10) Patent No.: US 11,102,605 B2
(45) Date of Patent: Aug. 24, 2021

(54) AUDIO SIGNAL PROCESSING APPARATUS AND AUDIO SIGNAL PROCESSING METHOD

(71) Applicant: YAMAHA CORPORATION, Hamamatsu (JP)

(72) Inventor: Yuji Ikegaya, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

(21) Appl. No.: 16/658,545

(22) Filed: Oct. 21, 2019

(65) Prior Publication Data
US 2020/0137510 A1  Apr. 30, 2020

(30) Foreign Application Priority Data
Oct. 24, 2018 (JP) .............................. JP2018-200308

(51) Int. Cl.
| H04R 5/00 | (2006.01) |
|---|---|
| H04R 3/00 | (2006.01) |
| H04S 7/00 | (2006.01) |
| H04R 3/04 | (2006.01) |
| H04R 5/04 | (2006.01) |

(52) U.S. Cl.
CPC ............. *H04S 7/307* (2013.01); *H04R 3/005* (2013.01); *H04R 3/04* (2013.01); *H04R 5/04* (2013.01); *H04R 2430/01* (2013.01); *H04S 2400/01* (2013.01); *H04S 2400/13* (2013.01)

(58) Field of Classification Search
CPC .. H04S 7/307; H04S 2400/01; H04S 2400/13; H04R 3/005; H04R 3/04; H04R 5/04; H04R 2430/01

USPC ...................................................... 381/26, 122
See application file for complete search history.

(56) References Cited

U.S. PATENT DOCUMENTS

| 3,992,584 A | 11/1976 | Dugan | |
|---|---|---|---|
| 4,449,238 A * | 5/1984 | Lee | H04N 7/15 348/14.08 |
| 9,565,493 B2 | 2/2017 | Abraham | |
| 2016/0112811 A1* | 4/2016 | Jensen | G10L 21/0232 381/17 |
| 2017/0164101 A1* | 6/2017 | Rollow, IV | H04R 3/04 |

(Continued)

FOREIGN PATENT DOCUMENTS

| JP | 2008048342 A | 2/2008 |
|---|---|---|
| JP | 2016126136 A | 7/2016 |

(Continued)

OTHER PUBLICATIONS

Extended European Search Report issued in European Appln. No. 19204530.0 dated Mar. 24, 2020.

(Continued)

*Primary Examiner* — Ammar T Hamid
(74) *Attorney, Agent, or Firm* — Rossi, Kimms & McDowell LLP

(57) ABSTRACT

An audio signal processing method includes selecting a channel group of at least two channels according to a predetermined reference, from among audio signals of at least three channels; and controlling a gain of the audio signal of each channel of the selected channel group, according to a volume level of the audio signal of each channel of the channel group.

13 Claims, 13 Drawing Sheets

(56) References Cited

U.S. PATENT DOCUMENTS

2018/0359562 A1* 12/2018 Skramstad ............... H04R 3/04

FOREIGN PATENT DOCUMENTS

| WO | 8303512 A1 | 10/1983 |
| WO | 2016176429 A2 | 11/2016 |

OTHER PUBLICATIONS

Yamaha Corporation. "Automatic Microphone Mixer," Apr. 2013: 1-8. Web: Sep. 12, 2018. URL: https://jp.yamaha.com/files/download/other_assets/8/329528/Automixer_WhitePaper_ja.pdf. Cited in Specification. English translation provided.

* cited by examiner

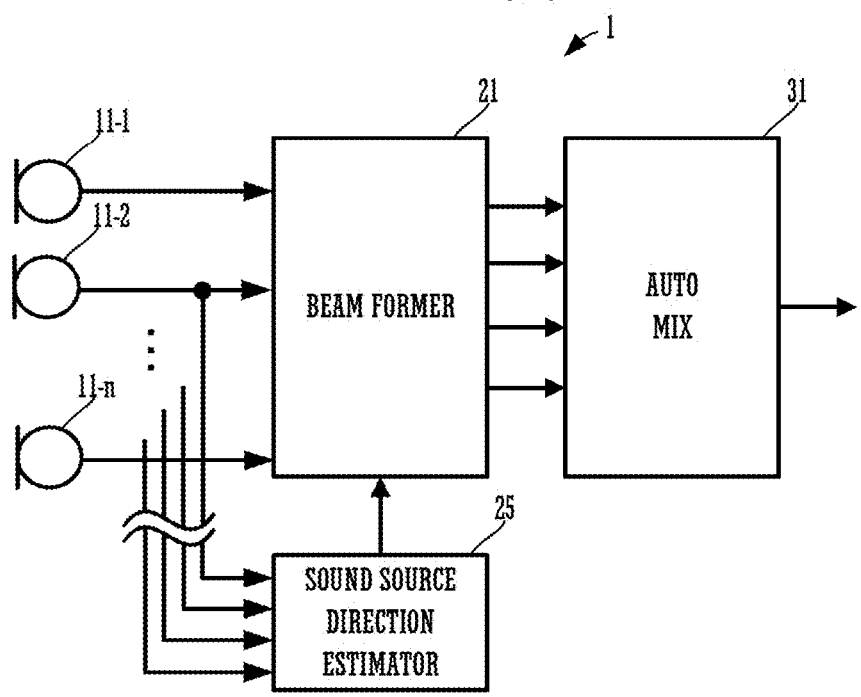
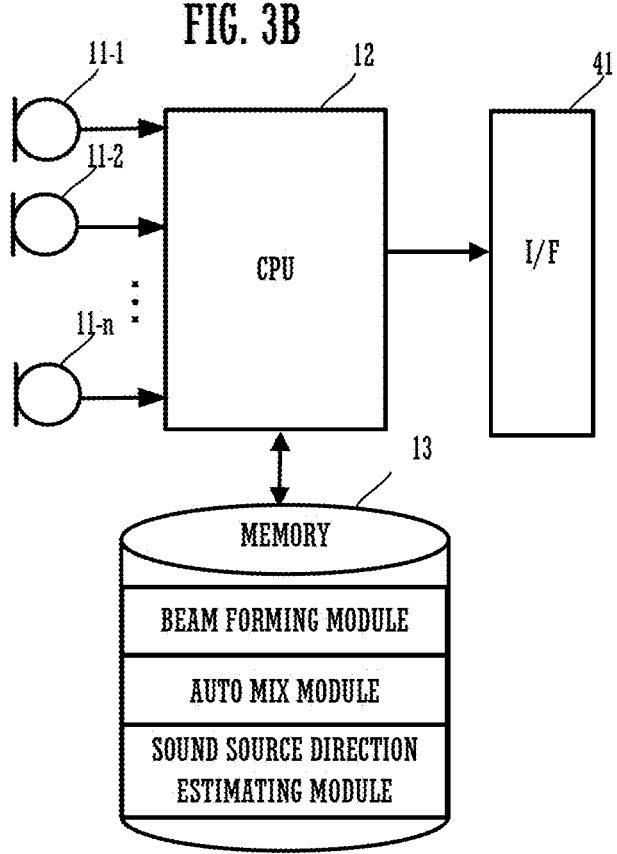

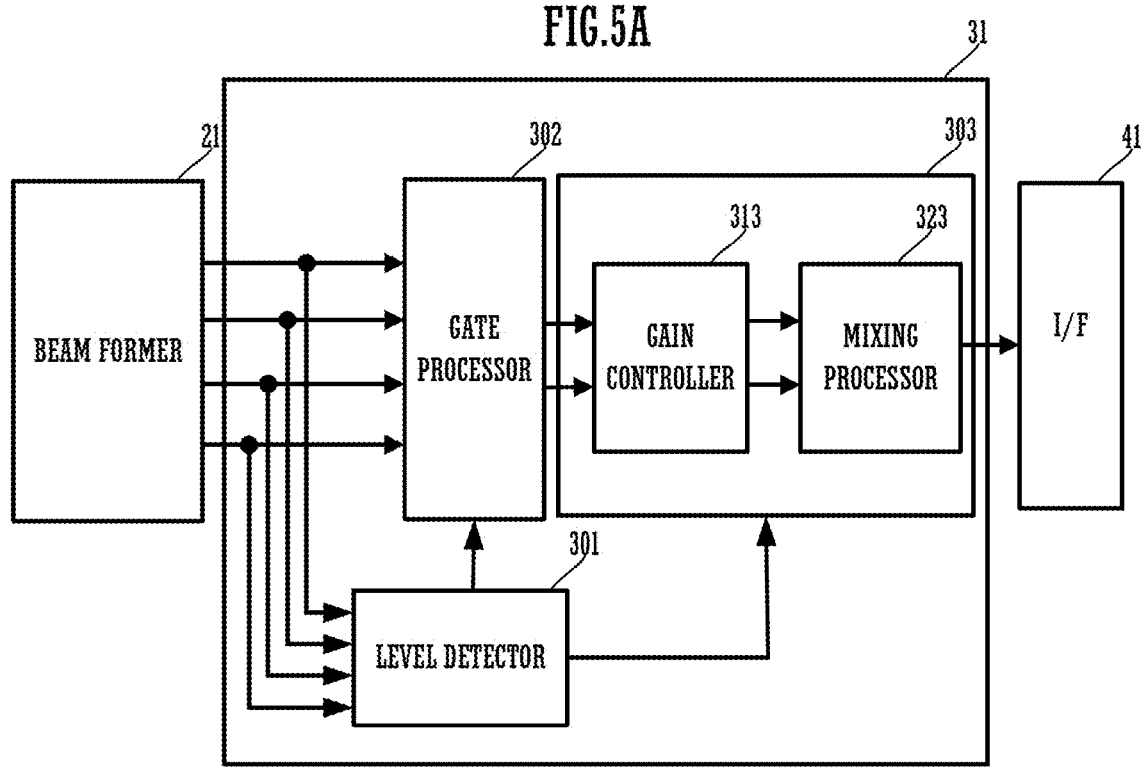
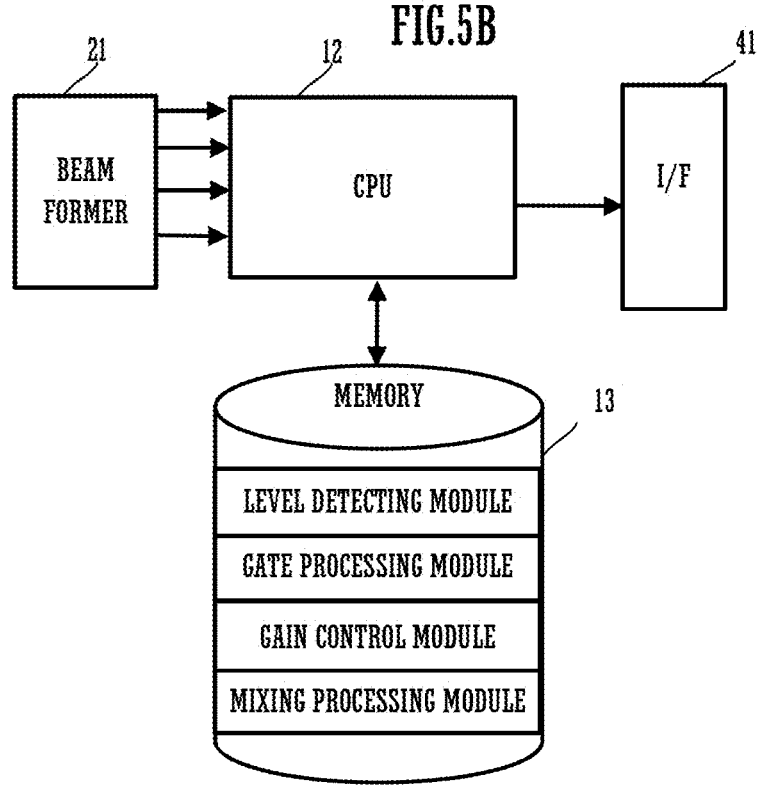

AUDIO SIGNAL PROCESSING APPARATUS AND AUDIO SIGNAL PROCESSING METHOD

CROSS REFERENCE TO RELATED APPLICATIONS

This Nonprovisional application claims priority under 35 U.S.C. § 119(a) on Patent Application No. 2018-200308 filed in Japan on Oct. 24, 2018 the entire contents of which are hereby incorporated by reference.

BACKGROUND OF THE INVENTION

1. Field of the Invention

A preferred embodiment according to the present invention relates to an audio signal processing apparatus and an audio signal processing method that process an audio signal.

2. Description of the Related Art

Japanese Unexamined Patent Application Publication No. 2016-126136, The U.S. Pat. No. 3,992,584, and "Automatic Microphone Mixer," [online], April 2013, [retrieved on Sep. 12, 2018], the internet <URL: https://jp.yamaha.com/files/download/other_assets/8/329528/Automixer_WhitePaper_ja.pdf>disclose an automatic mixer as an example of an apparatus that processes an audio signal. As described in "Automatic Microphone Mixer," [online], April 2013, [retrieved on Sep. 12, 2018], the internet <URL: https://jp.yamaha.com/files/download/other_assets/8/329528/Automixer_WhitePaper_ja.pdf>, a method of gain control in an automatic mixer includes two types: a gating type and a gain sharing type. The gating type gain control, among a plurality of audio signals, makes an audio signal corresponding to a talker pass and blocks other audio signals. The gain sharing type sets a gain according to the level of each audio signal.

In the gating type gain control, a time lag occurs from when a talker is changed to when a gain of a microphone of the talker increases. Therefore, the beginning of an utterance of a new talker may be unable to be collected.

On the other hand, in the gain sharing type gain control, when the voice of a talker is leaked and collected by a plurality of microphones, a gain of microphones other than a microphone that is closest to the talker increases, so that clarity is reduced.

SUMMARY OF THE INVENTION

In view of the foregoing, an object of a preferred embodiment of the present invention is to provide an audio signal processing apparatus and an audio signal processing method that are able to appropriately collect the beginning of an utterance and also prevent clarity from being reduced.

An audio signal processing apparatus according to a preferred embodiment of the present invention includes a selector that selects a channel group of at least two channels according to a predetermined reference, from among audio signals of at least three channels; and a gain controller that controls a gain of the audio signal of each channel of the channel group selected by the selector according to a volume level of the audio signal of each channel of the channel group.

The above and other elements, features, characteristics, and advantages of the present invention will become more apparent from the following detailed description of the preferred embodiments with reference to the attached drawings.

BRIEF DESCRIPTION OF THE DRAWINGS

FIG. 3A is a block diagram showing an example of a configuration of the array microphone 1, and FIG. 3B is a block diagram showing a configuration of another example of the array microphone 1.

FIG. 5A is a block diagram showing a functional configuration of an AUTOMIX 31, and FIG. 5B is a block diagram showing a configuration of another example of the AUTOMIX 31.

DETAILED DESCRIPTION OF THE PREFERRED EMBODIMENTS

An audio signal processing apparatus according to the present preferred embodiment of the present invention includes a selector that selects a channel group of at least two channels according to a predetermined reference, from among audio signals of at least three channels; and a gain controller that controls a gain of the audio signal of each channel of the channel group selected by the selector, according to a volume level of the audio signal of each channel of the channel group.

In this manner, the audio signal processing apparatus according to the present preferred embodiment first narrows down the number of channels by gating type gain control, and then performs gain sharing type gain control. Even when the voice of a talker leaks to a plurality of microphones, a mixer including the audio signal processing apparatus according to the present preferred embodiment narrows down the number of channels by the gating type gain control, which makes it possible to prevent clarity from being reduced. In addition, the mixer according to the present preferred embodiment performs the gain sharing type gain control, which makes it possible to appropriately collect the beginning of an utterance.

It is to be noted that the selector may preferably selects based on the volume level of each channel of the at least three channels. The selector selects two channels at the highest volume level, for example. As a result, since the channels are narrowed down to the microphone that appropriately collects the voice of a talker, the beginning of an utterance is appropriately able to be collected and a reduction in clarity is also able to be prevented.

It is to be noted that the mixer may include a plurality of microphones, and a beam former that forms at least three sound collection beams using sound collection signals of the plurality of microphones, and outputs the sound collection beams as audio signals of the at least three channels.

In a case in which a plurality of sound collection beams are formed, the plurality of sound collection beams have a certain amount of sound collection region. Accordingly, the voice of a talker may be collected by each of the plurality of sound collection beams. Accordingly, the mixer according to the present preferred embodiment, since narrowing down the number of beams by an automatic mixer of a gate type, is able to prevent the reduction in clarity.

In particular, the voice of a talker may be collected by each of the plurality of sound collection beams that are adjacent to each other. Accordingly, the selector may preferably not simultaneously select sound collection beams in which sound collection directions are adjacent to each other, among the at least three sound collection beams.

Figure 1:
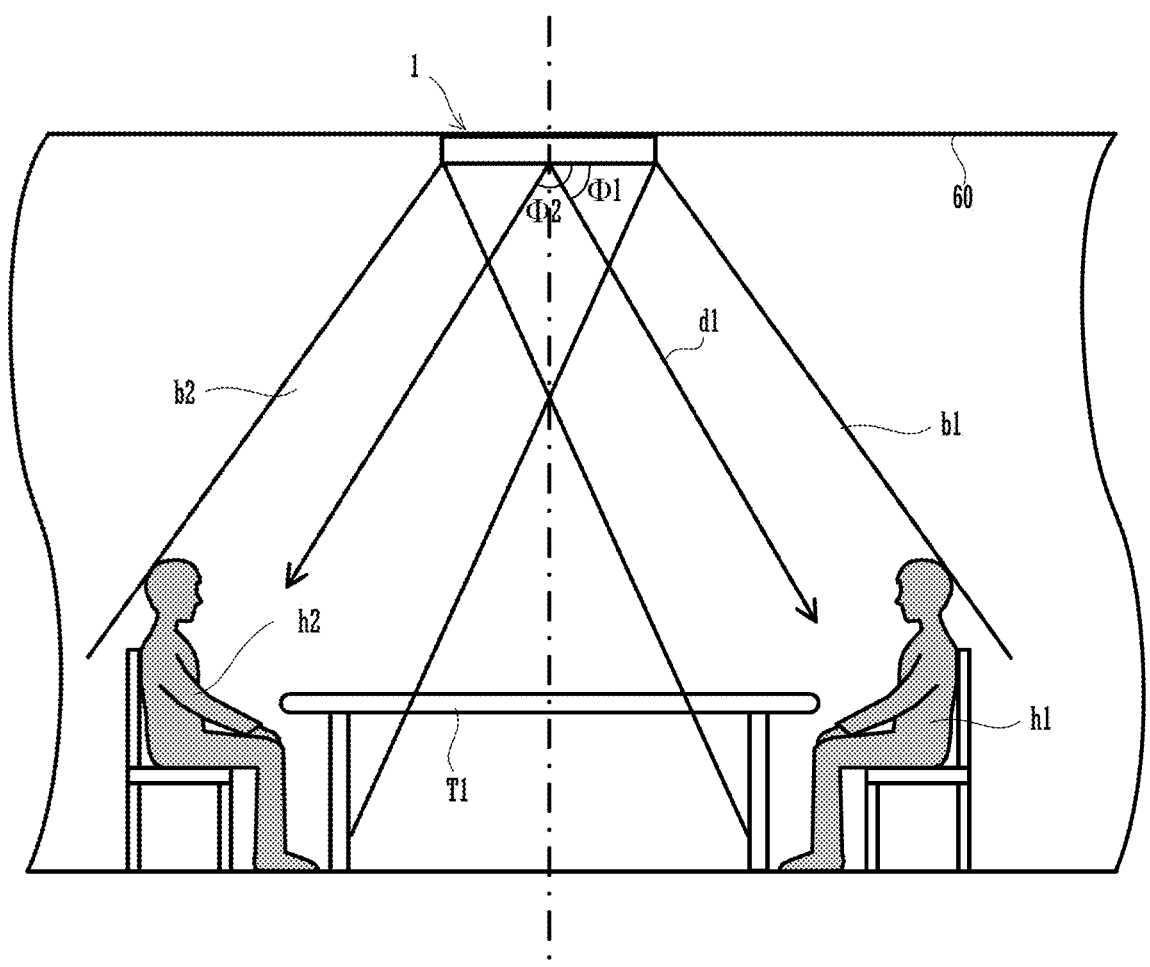
FIG. 1 is an elevational view of the interior of a room in which an array microphone 1 is installed.
Figure 2:
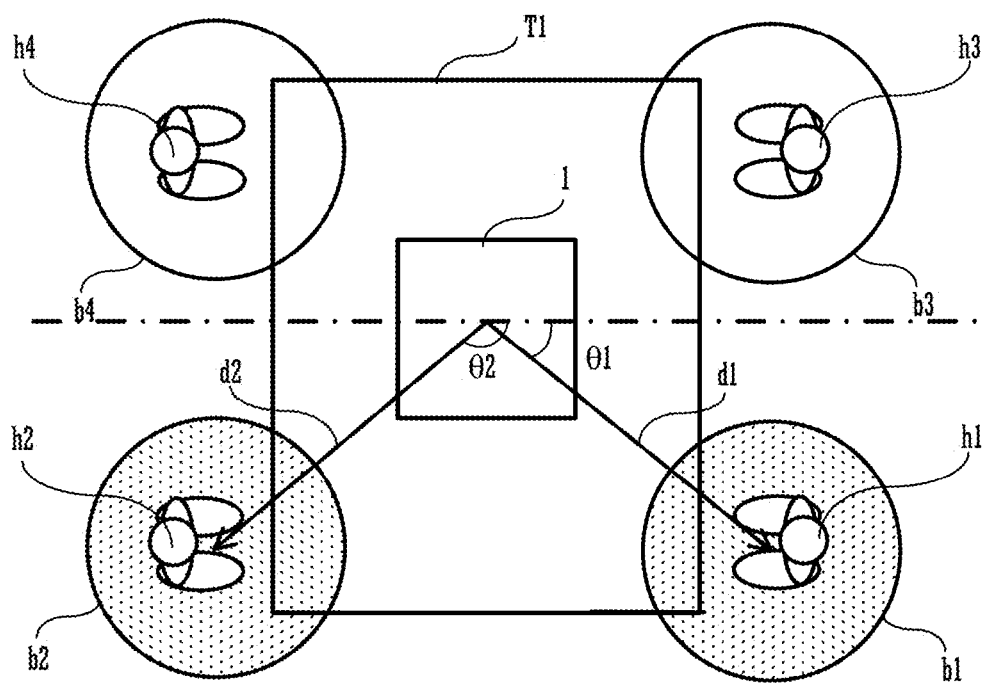
FIG. 2 is a plan view of the interior of the room in which the array microphone 1 is installed.

Hereinafter, a specific configuration according to the present preferred embodiment will be described. FIG. 1 is an elevational view of an interior of a room in which an array microphone 1 is installed, and FIG. 2 is a plan view of the interior of the room in which the array microphone 1 is arranged.

The array microphone 1 is installed on a ceiling 60 in a room. A conference desk T1 is installed directly under the array microphone 1. In the example of FIG. 1 and FIG. 2, a plurality of users (talkers): a user h1, a user h2, a user h3, and a user h4 are present around the conference desk T1. The array microphone 1 has a housing having a thin rectangular parallelepiped shape. In the example of FIG. 1, the top surface of the array microphone 1 is installed on the ceiling 60. It is to be noted that the array microphone 1 may be hung from the ceiling 60, for example. In addition, the array microphone 1 may be configured as a ceiling tile. Moreover, the array microphone 1 may be provided as interior equipment or may be configured to be replaceable. In a case in which the array microphone 1 is configured as a ceiling tile, the ceiling tile is configured to be replaceable. In addition, although the array microphone 1 according to the present preferred embodiment is installed on the ceiling 60, the array microphone 1 does not necessarily need to be installed on the ceiling 60. For example, the array microphone 1 may be installed on a wall surface, a desk top, a floor, or the like.

Figure 4:
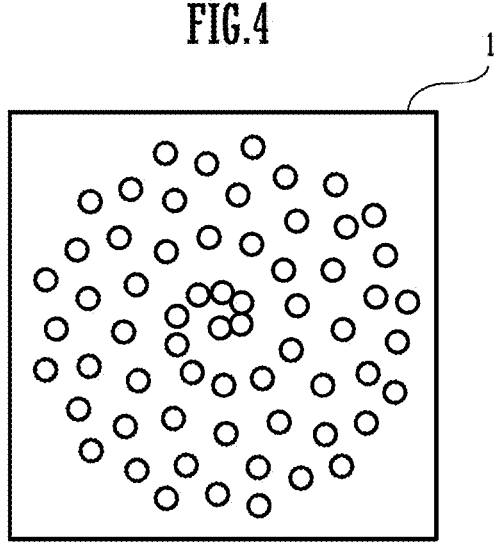
FIG. 4 is a bottom view of the array microphone 1.

FIG. 3A is a block diagram showing an example of a configuration of the array microphone 1. FIG. 3B is a block diagram showing a configuration of another example of the array microphone 1. The array microphone 1, as shown in FIG. 3A, includes a plurality of microphones 11-1 to 11-$n$, a beam former 21, an auto mixer (AUTOMIX) 31, an interface (I/F) 41, and a sound source direction estimator 25. FIG. 4 is a flow chart showing an operation of the array microphone 1.

Each of the beam former 21, the AUTOMIX 31, and the sound source direction estimator 25 may be configured by hardware or may be configured by software. In a case in which the above components are configured by software, such as the beam forming module, the AUTOMIX module and the sound source direction estimating module, as shown in FIG. 3B. A processor such as a CPU 12 reads and performs the software stored in a storage medium such as a memory 13. The CPU 12 performs the same function as the beam former 21 by executing the beamforming module. The CPU 12 performs the same function as the AUTOMIX 31 by executing the AUTOMIX module. The CPU 12 performs the same function as the sound source direction estimator 25 by executing the sound source direction estimating module. It is to be noted that the software does not need to be stored in the memory or the like of the array microphone 1 and may be downloaded each time from another device such as a server and executed. When each of the beam former 21, the AUTOMIX 31, and the sound source direction estimator 25 is configured by software, each of CPU12 and memory 13 may be plural.

The plurality of microphones 11-1 to 11-$n$ are arranged on the bottom surface of the housing of the array microphone 1. The sound collection direction of the plurality of microphones 11-1 to 11-$n$ is directed downward of the array microphone 1.

FIG. 4 is a view when the array microphone 1 is viewed from the side of the bottom surface. The large number of circles shown in FIG. 4 represent the plurality of microphones 11-1 to 11-$n$. The plurality of microphones 11-1 to 11-$n$, as shown in FIG. 4, configure an array microphone arranged in a plane. However, the arrangement of the plurality of microphones 11-1 to 11-$n$ is not limited to the example shown in FIG. 4. It is to be noted that the plurality of microphones 11-1 to 11-$n$ may be non-directional microphones or may be directional microphones.

As shown in FIG. 3A, an audio signal (hereinafter referred to as a sound collection signal) that has been collected by each of the plurality of microphones 11-1 to 11-$n$ is inputted to the beam former 21. The beam former 21 delays sound collection signals of the plurality of microphones 11-1 to 11-$n$ with a predetermined amount of delay and combines the sound collection signals. As a result, the beam former 21 forms a sound collection beam having strong sensitivity in a predetermined direction, and outputs the sound collection beam as a sound collection signal of a different channel. The beam former 21 is able to form a plurality of sound collection beams. In the example of the present preferred embodiment, the beam former 21 forms four sound collection beams (a first sound collection beam b1, a second sound collection beam b2, a third sound collection beam b3, and a fourth sound collection beam b4) at the maximum (see FIG. 2), and outputs the sound collection signals of the four channels. The number of sound collection beams and the direction of each sound collection beam are determined based on a sound source direction that has been estimated by the sound source direction estimator 25.

Each of the sound collection signals of the four channels according to the four sound collection beams is inputted to the AUTOMIX 31.

Figure 6:
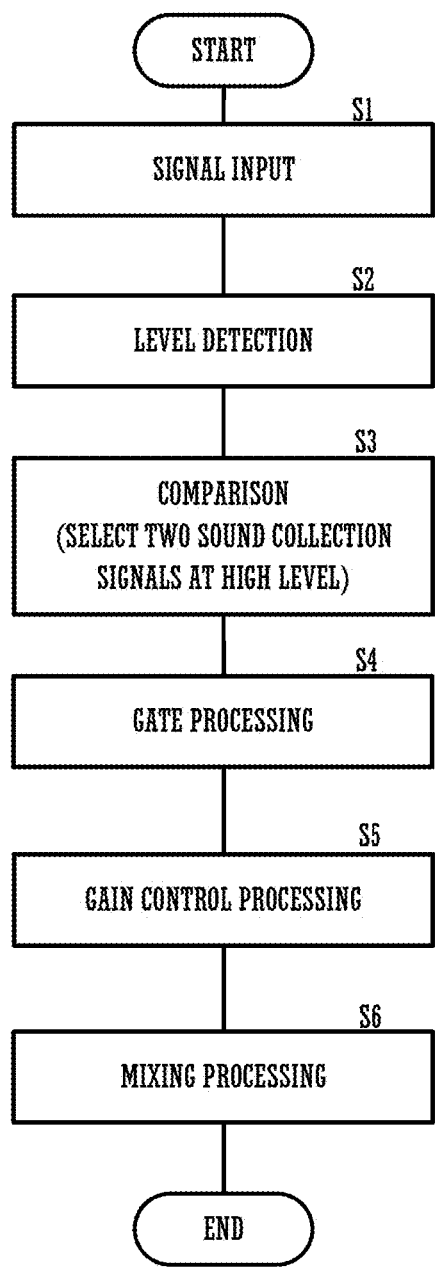
FIG. 6 is a flow chart showing an operation of the AUTOMIX 31.

FIG. 5 is a block diagram showing a functional configuration of the AUTOMIX 31. FIG. 6 is a flow chart showing an operation of the AUTOMIX 31. The AUTOMIX 31 includes a level detector 301, a gate processor 302, and a gain sharing processor 303.

The level detector 301 and the gate processor 302 receive an input of the sound collection signals of the four channels according to the four sound collection beams (the first sound collection beam b1, the second sound collection beam b2, the third sound collection beam b3, and the fourth sound collection beam b4) (S1).

The level detector 301 detects a level of a sound collection signal of each channel (S2). The level detector 301 compares a detected level of the sound collection signal of each detected channel (S3). In this example, the level detector 301 selects two sound collection signals at a high level.

The gate processor 302 corresponds to a selector, causes the sound collection signals of the two channels that have been selected by the level detector 301 to pass, and performs gate processing to block sound collection signals of other channels (S4). The gate processor 302 outputs only the sound collection signals of the two channels at a high level among the sound collection signals of four channels, to the gain sharing processor 303.

The gain sharing processor 303 receives information that indicates the level of the sound collection signal of each channel from the level detector 301. The gain sharing processor 303 functionally includes a gain controller 313 and a mixing processor 323. The gain controller 313, according to the level of each channel, controls a gain of an audio signal of each channel (S5). The mixing processor 323 mixes an audio signal (S6). Specifically, the mixing processor 323 mixes the audio signal of each channel that has been gain-adjusted by the gain controller 313. In this manner, the gain sharing processor 303 performs gain sharing processing to mix a sound collection signal by the gain according to the level of each channel. As a result, a sound collection beam at a high level among the two sound collection beams is emphasized, so that the array microphone 1 is able to clearly obtain the voice of a current talker. It is to be noted that the mixing processing by the mixing processor 323 is not essentially required in the present invention. The gain sharing processor 303 may output the audio signal of each channel that has been gain-adjusted by the gain controller 313, to the I/F 41. In such a case, for example, in a device at a remote place, a gain-adjusted audio signal of each channel may be mixed.

As shown in FIG. 2, each of the four sound collection beams is directed in a different direction. However, each sound collection beam has a certain amount of sound collection region. Accordingly, the voice of a talker may leak to each sound collection beam and may be collected by each sound collection beam. In particular, sound in a low frequency range is easier to be diffracted than sound in a high frequency range. Accordingly, when gain sharing processing performed on all the signals of the four sound collection beams, the low frequency range may be easily emphasized, which may cause the voice of a talker to be muffled sound. On the other hand, when the gate processor 302 narrowed down to one sound collection beam, and the talker is changed, a time lag occurs until the talker is switched to a new talker. Therefore, the AUTOMIX 31 may be unable to collect the beginning of an utterance of the new talker.

In contrast, the AUTOMIX 31 according to the present preferred embodiment first narrows down the four sound collection beams to two sound collection beams in the gate processor 302. As a result, the number of sound collection signals to be inputted to the gain sharing processor 303 is narrowed down. Therefore, the AUTOMIX 31 improves clarity, compared to performing the gain sharing processing on all the signals of the four sound collection beams. In addition, the AUTOMIX 31 performs the gain sharing processing by using sound collection signals of not only the sound collection beam at the highest level but also the sound collection beam at a subsequently higher level. The AUTOMIX 31, since the sound collection signal according to other sound collection beams is also inputted to the gain sharing processor 303, even when a talker is changed, is able to appropriately collect the beginning of an utterance of the new talker. It is to be noted that, in the above example, the gate processor 302 have selected two sound collection beams at a high level among the four sound collection beams. However, the number of sound collection beams to be selected is not limited to two and may be three. In addition, the number of sound collection beams may be three or five or more. In other words, the gate processor 302 may select partial channels (a channel group) of two or more channels among audio signals of three or more channels.

It is to be noted that, in the above example, the gate processor 302 has made a selection based on the level of each channel. However, the gate processor 302 may select a sound collection beam using an estimated result by the sound source direction estimator 25 to be described later.

Each of the level detector 301, the gate processor 302, the gain controller 313 and the mixing processor 323 may be configured by software, for example. In this case, the level detecting module, the gate processing module, the gain controlling module and mixing processing module are stored in the memory 13. The CPU 12 performs a same function as the level detector 301 by reading and executing the level detecting module stored in the memory 13. The CPU 12 performs a same function as the gate processor 302 by reading and executing the gate processing module stored in the memory 13. The CPU 12 performs a same function as the gain controller 313 by reading and executing the gain controlling module stored in the memory 13. The CPU 12 performs a same function as the mixing processor 323 by reading and executing the mixing processing module stored in the memory 13.

The sound collection signal mixed by the AUTOMIX 31 is inputted to the I/F 41. The I/F 41 is a communication I/F such as a USB, for example. The I/F 41 encodes an inputted sound collection signal into a predetermined data format, and transmits an encoded signal to another device such as a personal computer. As a result, the array microphone 1 is able to transmit the collected sound to a device at a remote place, and is able to achieve a teleconference. It is to be noted that the I/F 41 may receive an audio signal from the device at a remote place. The I/F 41 outputs a received audio signal to a not-shown speaker. As a result, a conference participant can hear a sound of a remote place.

Figure 7:
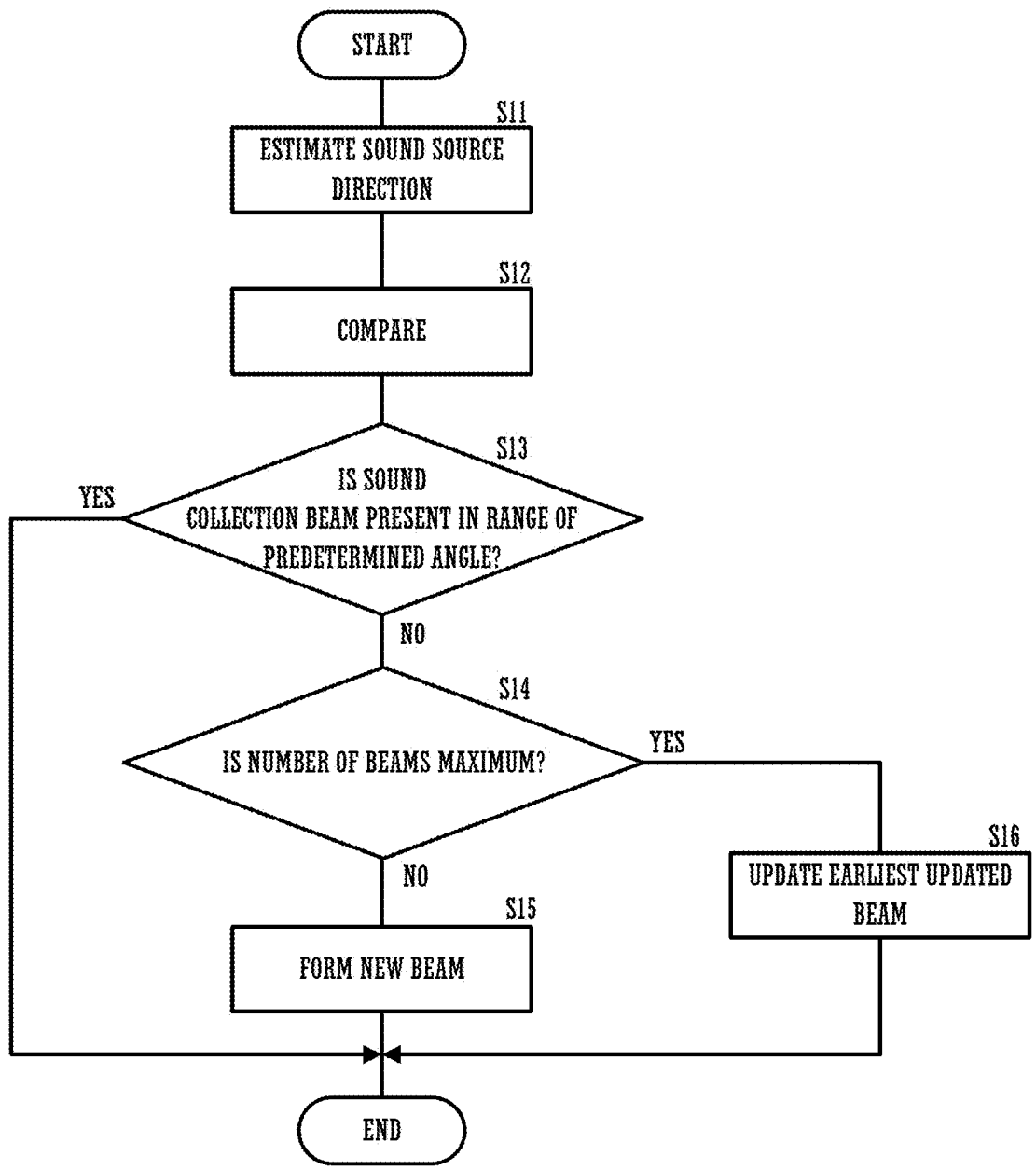
FIG. 7 is a flow chart showing an operation of the array microphone 1.

The sound source direction estimator 25 estimates a sound source direction using a sound collection signal of a plurality of microphones (S11 shown in the flow chart of FIG. 7). The sound source direction estimator 25 estimates a sound source direction by calculating the cross correlation of the sound collection signal of the plurality of microphones, for example. The sound source direction estimator 25, by obtaining the peak of the cross correlation of the sound collection signals of certain two microphones, for example, is able to obtain a direction of a sound source with respect to these two microphones. Furthermore, the sound source direction estimator 25, by obtaining the peak of the cross correlation of the sound collection signals of two different microphones, is able to obtain a direction of a sound source with respect to these two different microphones. The sound source direction estimator 25 estimates a sound source direction based on a plurality of cross correlation peaks calculated in this manner.

Only the estimation of the sound source direction by the two microphones is able to estimate only a one-dimensional direction (a plane direction or an elevation direction, for example). Alternatively, only the estimation of the sound source direction by the two microphones is able to estimate only a one-dimensional direction and a distance to a sound source. However, the sound source direction estimator 25, from the array microphone arranged in a plane, selects two or more sets of a plurality of microphones, and obtains a plurality of cross correlation peaks. As a result, the sound source direction estimator 25 estimates a two-dimensional direction (the plane direction and the elevation direction). Moreover, the sound source direction estimator 25, in addition to the two-dimensional direction, is also able to estimate a distance to a sound source.

In addition, the number of sound sources to be estimated and the estimation accuracy improve as the number of microphones and the number of cross correlations to be calculated increase. The sound source direction estimator 25 according to the present preferred embodiment estimates two sound source directions. In other words, the sound source direction estimator 25 estimates two sound source directions by obtaining two more peaks (two peaks from the high level) of each cross correlation.

It is to be noted that the method of estimating a sound source direction is not limited to the above example. The sound source direction estimator 25 is also able to estimate a sound source direction, for example, by comparing the levels of the sound collection beams in a plurality of directions, the sound collection beams being formed by the beam former 21. In such a case, the beam former 21 forms a sound collection beam in a plurality of directions (1000 directions, for example) in a room in advance. The sound source direction estimator 25 obtains the level of each of the sound collection beams in the plurality of directions. The sound source direction estimator 25 obtains spatial level distribution of the sound collection beams in the plurality of directions. The sound source direction estimator 25 estimates a plurality of directions of a sound source based on the level distribution.

However, as described above, in a case in which a large number (1000 directions, for example) of sound collection beams are formed and spatial level distribution is obtained, the amount of calculation is extremely large. In addition, in a case in which a sound source direction is estimated based on the peak of cross correlation, it is difficult to estimate a large number of sound source directions. Accordingly, the array microphone 1 according to the present preferred embodiment, in order to reduce the amount of calculation, by causing the number of sound collection beams to be greater than the estimation number of sound source directions while reducing the estimation number of sound source directions, supports a large number of sound sources.

Figure 8:
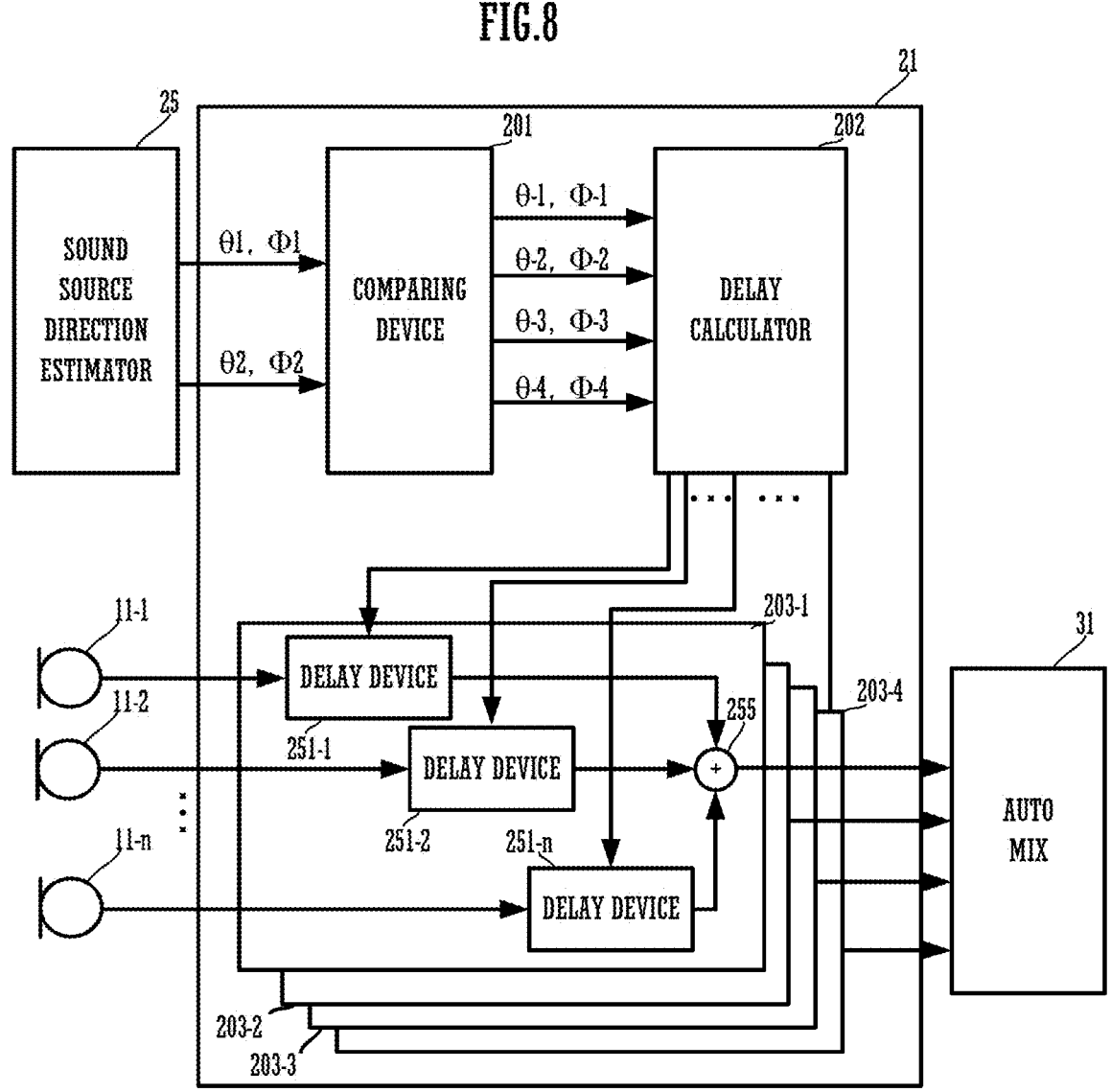
FIG. 8 is a block diagram showing a functional configuration of a beam former 21.

The beam former 21 controls the number and direction of sound collection beams based on the sound source direction that the sound source direction estimator 25 has estimated. FIG. 8 is a block diagram showing a functional configuration of the beam former 21.

The beam former 21 functionally includes a comparing device 201, a delay calculator 202, a delayer 203-1, a delayer 203-2, a delayer 203-3, and a delayer 203-4. The delayer 203-1 includes a delay device 251-1 to a delay device 251-$n$, and an adder 255. The delayer 203-1, the delayer 203-2, the delayer 203-3, and the delayer 203-4 each have the same configuration.

Each functional configuration of the beam former 21 is achieved when hardware such as the CPU 12 or a DSP that configures the beam former 21 reads and executes a program from the memory 13.

The comparing device 201 receives an input of information on the sound source direction that the sound source direction estimator 25 has estimated. In this example, the comparing device 201 receives an input of information that indicates a first sound source direction d1 and an input of information that indicates a second sound source direction d2. The information that indicates the first sound source direction d1 includes an angle θ1 around a vertical axis that indicates the plane direction and an angle Φ1 around a horizontal axis that indicates the elevation direction. The information that indicates the second sound source direction d2 includes an angle θ2 around the vertical axis and an angle Φ2 around the horizontal axis. The angle around the vertical axis, as shown in FIG. 2, is represented by the relative angle on the basis of a predetermined direction (the right direction in FIG. 2) in a plan view of the housing of the array microphone 1. The angle around the horizontal axis, as shown in FIG. 1, is represented by the relative angle on the basis of a predetermined direction (the right direction in FIG. 1) in an elevation view of the housing of the array microphone 1.

The comparing device 201 determines the number and direction of sound collection beams based on the first sound source direction d1 and the second sound source direction d2 that have been inputted from the sound source direction estimator 25. In the present preferred embodiment, four sound collection beams are formed at the maximum. Accordingly, the comparing device 201 sets the direction of the first sound collection beam b1 to the angle θ-1 and the angle Φ-1, sets the direction of the second sound collection beam b2 to the angle θ-2 and the anngle Φ-2, sets the direction of the third sound collection beam b3 to the angle θ-3 and the angle Φ-3, and sets the direction of the fourth sound collection beam b4 to the angle θ-4 and the angle Φ-4.

The comparing device 201 transmits angle information on each set sound collection beam to the delay calculator 202. The delay calculator 202, based on the angle information on each received sound collection beam, calculates the amount of delays of each of the delay device 251-1 to the delay device 251-$n$ in each of the delayer 203-1, the delayer 203-2, the delayer 203-3, and the delayer 203-4. Then, the delay calculator 202 sets the amount of delays of each of the delay device 251-1 to the delay device 251-$n$ in each of the delayer 203-1, the delayer 203-2, the delayer 203-3, and the delayer 203-4. Each of the delay device 251-1 to the delay device 251-$n$ in each of the delayer 203-1, the delayer 203-2, the delayer 203-3, and the delayer 203-4 delays an inputted sound collection signal, and outputs the delayed sound collection signal to the adder 255. The adder 255 forms a sound collection beam by combining these sound collection signals. The sound collection beam that has been formed is outputted to the AUTOMIX 31.

The comparing device 201 stores the angle information on each current sound collection beam in the memory 13. The comparing device 201 compares the angle of the first sound source direction d1 and the second sound source direction d2, and the angle of each current sound collection beam (S12 shown in the flow chart of FIG. 7).

The comparing device 201 determines whether or not a sound collection beam is present within a predetermined angle range with respect to each of the first sound source direction d1 and the second sound source direction d2 (S13). The comparing device 201 determines whether or not a sound collection beam is present within the range of the angle θ1±5 degrees and the angle Φ1±5 degrees, for example. The comparing device 201, in a case of determining that a sound collection beam is present within the predetermined angle range in both the first sound source direction d1 and the second sound source direction d2, skips the subsequent processing. As a result, the setting of the current sound collection beam is maintained.

The comparing device 201, in a case of determining that a sound collection beam is not present within the predetermined angle range in either the first sound source direction d1 or the second sound source direction d2, determines whether or not the current number of beams reaches the maximum number (S14). In this example, the maximum number of sound collection beams is four. Accordingly, the comparing device 201 determines whether or not four sound collection beams are being currently formed.

The comparing device 201, in a case of determining that three or less sound collection beams are being currently formed, forms a new sound collection beam (S15). The comparing device 201 sets the direction of the new sound collection beam to the first sound source direction d1 or the second sound source direction d2. For example, the comparing device 201, in a case of determining that a sound collection beam is not present within the range of the angle $\theta1\pm5$ degrees and the angle $\Phi1\pm5$ degrees when the current number of sound collection beams is three, sets the angle $\theta$-4 and the angle $\Phi$-4 of the fourth sound collection beam b4 to the angle $\theta1$ and the angle $\Phi1$. As a result, the new fourth sound collection beam b4 is directed in the sound source direction.

In addition, the comparing device 201, in a case of determining that four sound collection beams are being currently formed, updates the angle of the earliest updated sound collection beam (S16).

Figure 9:
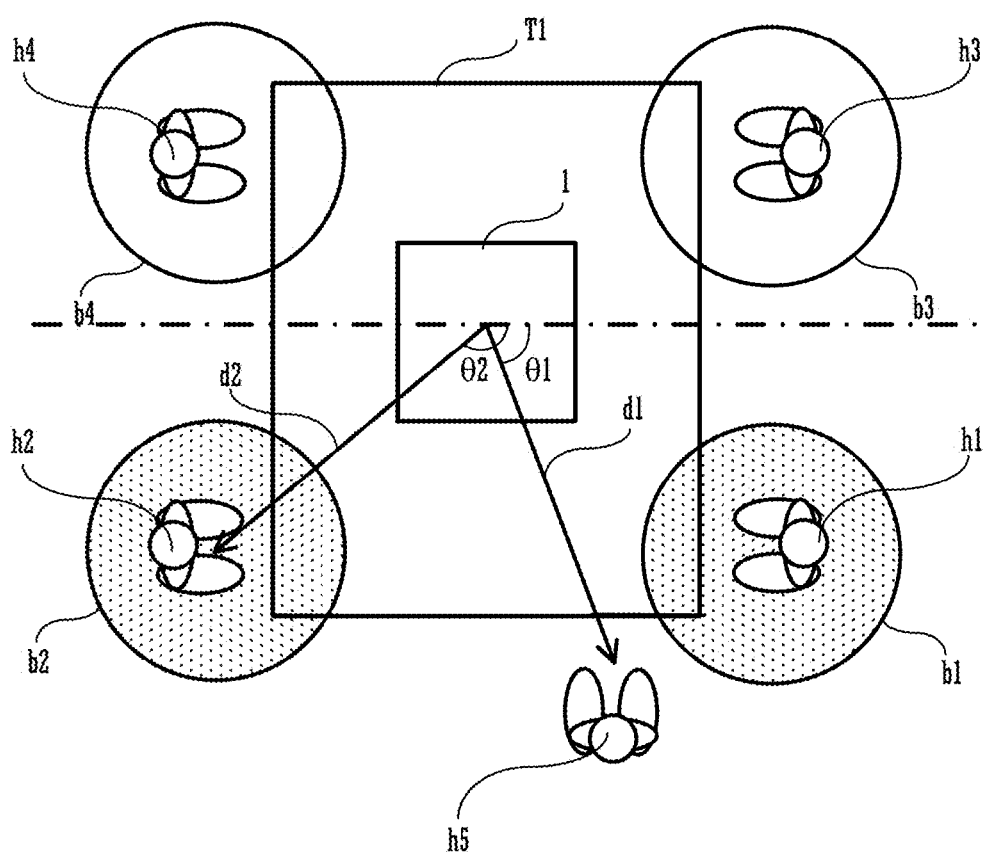
FIG. 9 is a plan view of the interior of a room in which the array microphone 1 is installed.
Figure 10:
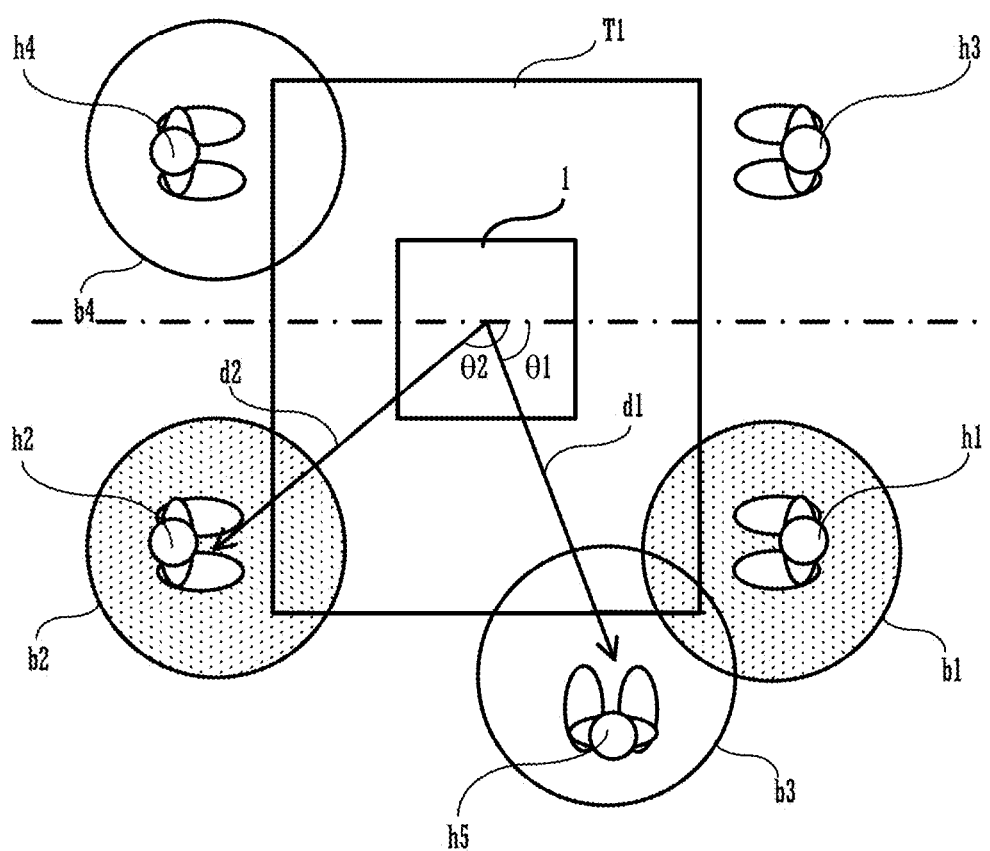
FIG. 10 is a plan view of the interior of a room in which the array microphone 1 is installed.

The plan views of FIG. 9 and FIG. 10 are views illustrating a case in which the talker h1 ends an utterance and the talker h2 and a new talker h5 issue an utterance, as an example.

The sound source direction estimator 25 estimates the first sound source direction d1 in a direction of the talker h5. In addition, the sound source direction estimator 25 estimates the second sound source direction d2 in a direction of the talker h2. In such a case, the comparing device 201 determines that a sound collection beam is not present within the predetermined angle (within the range of the angle $\theta1\pm5$ degrees and the angle $\Phi1\pm5$ degrees, for example) of the first sound source direction d1. Then, as shown in the plan view of FIG. 10, the comparing device 201, in a case in which the earliest updated sound collection beam is the third sound collection beam, for example, sets the angle $\theta$-3 and the angle $\Phi$-3 of the third sound collection beam b3 to the angle $\theta1$ and the angle $\Phi1$. As a result, the third sound collection beam b3 is directed in the direction of the talker h5.

Even when the talker h5 ends the utterance and the talker h1 resumes an utterance, the first sound collection beam b1 is directed in the direction of the talker h1, so that the array microphone 1 is able to collect sound without lacking the beginning of the utterance of the talker h1. In addition, in the gate processor 302, when the first sound collection beam b1 and the third sound collection beam b3 are selected, is able to appropriately collect the beginning of an utterance with high clarity.

In this manner, the array microphone 1 causes the number of sound collection beams to be greater than the estimation number of sound source directions, and directs the sound collection beams in a direction in addition to the currently estimated sound source direction. Accordingly, the array microphone 1, even when a talker is changed, is able to collect an utterance of a new talker by the sound collection beam that has been already directed in another direction. Therefore, the array microphone 1 is able to collect the beginning of an utterance of a new talker while reducing the amount of calculation. In addition, the AUTOMIX 31 improves the clarity, compared to performing the gain sharing processing on all the signals of the four sound collection beams. The AUTOMIX 31 performs the gain sharing processing by using sound collection signals of not only the sound collection beam at the highest level but also the sound collection beam at a subsequently higher level. The AUTOMIX 31, since the sound collection signal according to other sound collection beams is also inputted to the gain sharing processor 303, even when a talker is changed, is able to appropriately collect the beginning of an utterance of the new talker.

It is to be noted that a sound collection beam to be updated is not limited to the earliest updated sound collection beam. For example, the comparing device 201 may update a sound source direction of which the angle is closest to the estimated sound source direction.

In addition, as described above, the gate processor 302 may select a sound collection beam using an estimated result by the sound source direction estimator 25. In other words, the gate processor 302 selects a sound collection beam corresponding to the sound source direction that the sound source direction estimator 25 has estimated. In such a case as well, the AUTOMIX 31, since selecting partial channels of two or more channels among audio signals of three or more channels and performing gain sharing processing, improves clarity and, even when a talker is changed, is able to appropriately collect the beginning of an utterance of a new talker.

Figure 11:
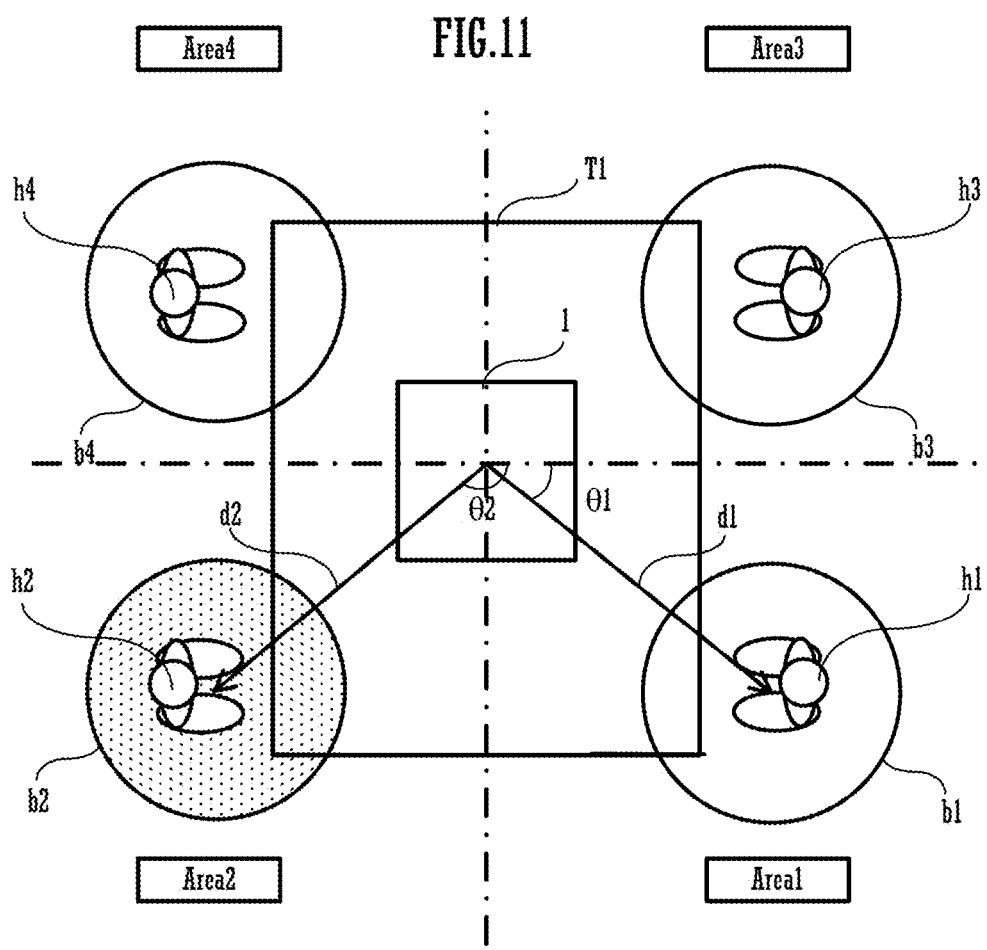
FIG. 11 is a plan view of the interior of a room in which the array microphone 1 is installed.

It is to be noted that the comparing device 201 may assign an area to each sound collection beam. For example, as shown in FIG. 11, the comparing device 201, in a plan view of the interior of the room, sets four areas. Then, the comparing device 201 sets an area (Area 1) assigned to the first sound collection beam, an area (Area 2) assigned to the second sound collection beam, an area (Area 3) assigned to the third sound collection beam, and an area (Area 4) assigned to the fourth sound collection beam. The comparing device 201 determines an area to which the estimated sound source direction belongs, and updates the angle of a corresponding sound collection beam.

The comparing device 201 may record the estimated frequency of the sound source direction for each area, and may determine the sound collection beam to be updated according to the estimated frequency. For example, in a case in which the estimated frequency in the sound source direction is high in the Area 1, and the estimated frequency in the sound source direction is low in the Area 3, the comparing device 201 may set the angle of the third sound collection beam assigned to the Area 3 to direct in the direction of the Area 1.

In addition, the sound collection direction of at least one sound collection beam among the plurality of sound collection beams may be fixed. A user may manually set and fix the direction of the sound collection beam. For example, in a case in which it is known in advance that a talker such as a chairperson with a high utterance frequency is present, the user sets the direction of a sound collection beam to the direction of the chairperson. As a result, the array microphone 1 is able to appropriately collect the beginning of an utterance while further reducing the amount of calculation.

In addition, the gate processor 302 may not simultaneously select sound collection beams of which the sound collection directions are adjacent to each other. In particular, the voice of a talker may be collected by each of the plurality of sound collection beams that are adjacent to each other. Accordingly, the gate processor 302, by simultaneously not-selecting sound collection beams of which the sound collection directions are adjacent to each other, is able to further improve clarity.

Figure 12:
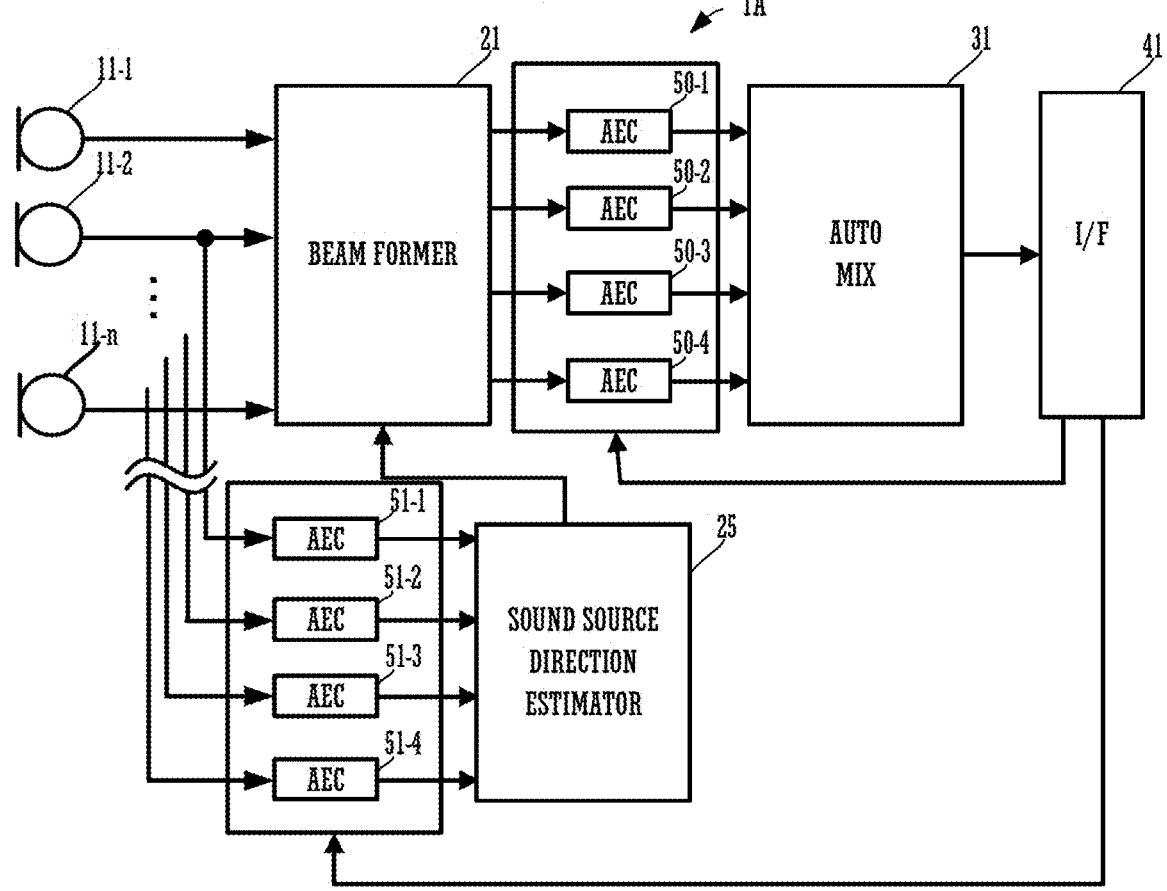
FIG. 12 is a block diagram showing a configuration of an array microphone 1A.

Subsequently, FIG. 12 is a block diagram showing a configuration of an array microphone 1A further including an echo canceller. The same reference numerals are used to refer to components common to the array microphone 1 shown in FIG. 3A, and the description will be omitted. The array microphone 1A of FIG. 12 includes a beam former 21, an AEC (an echo canceller) 50-1, an AEC 50-2, an AEC 50-3, and an AEC 50-4 that are connected to the AUTOMIX 31. In addition, the array microphone 1A includes an AEC 51-1, an AEC 51-2, an AEC 51-3, and an AEC 51-4 each of which is connected to the sound source direction estimator 25 and either of a plurality of microphones. The I/F 41 receives an audio signal from a device at a remote place. The I/F 41 outputs a received audio signal to the AEC 51-1, the AEC 51-2, the AEC 51-3, and the AEC 51-4. In addition, the I/F 41 outputs the received audio signal to the AEC 50-1, the AEC 50-2, the AEC 50-3, and the AEC 50-4.

Each of the AEC 51-1, the AEC 51-2, the AEC 51-3, and the AEC 51-4 receives an input of a sound collection signal of a corresponding microphone, and performs processing to reduce an echo component. Specifically, each of the AEC 51-1, the AEC 51-2, the AEC 51-3, and the AEC 51-4 includes a digital filter. The AEC 51-1, the AEC 51-2, the AEC 51-3, and the AEC 51-4 have a filter coefficient that simulates a transfer function from a speaker to a microphone. The AEC 51-1, the AEC 51-2, the AEC 51-3, and the AEC 51-4, by performing filter processing on an audio signal received from the device at a remote place, generate a pseudo echo signal that simulates an echo component. The AEC 51-1, the AEC 51-2, the AEC 51-3, and the AEC 51-4 reduce the pseudo echo signal from the sound collection signal of the microphone. As a result, the sound source direction estimator 25 is able to estimate a sound source direction by the sound collection signal of which the echo component has been reduced.

The AEC 50-1, the AEC 50-2, the AEC 50-3, and the AEC 50-4 respectively receive an input of a sound collection signal according to the first sound collection beam b 1, the second sound collection beam b2, the third sound collection beam b3, and the fourth sound collection beam b4, and perform processing to reduce an echo component. The processing to reduce an echo component is the same as the processing of the AEC 51-1, the AEC 51-2, the AEC 51-3, and the AEC 51-4. In this manner, the array microphone 1A is able to reduce the amount of calculation more by reducing an echo component from the sound collection signal according to the sound collection beam than by reducing an echo component from the sound collection signals of all the microphones.

Figure 13:
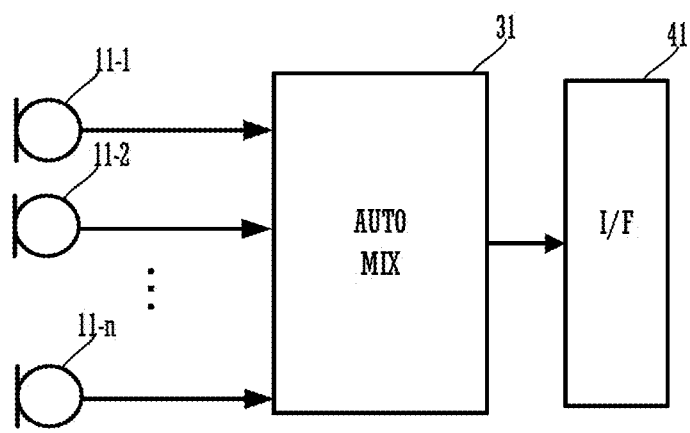
FIG. 13 is a block diagram showing a configuration of the array microphone 1 in a case in which a sound collection signal of a plurality of microphones provided for each talker is inputted.

It is to be noted that, in the present preferred embodiment, the AUTOMIX 31 receives an input of the sound collection signal according to the plurality of sound collection beams. However, the beam forming by the beam former 21 and the estimation of the sound source direction by the sound source direction estimator 25 are not essential. For example, as shown in FIG. 13, the AUTOMIX 31 may receive an input of the sound collection signal of the plurality of microphones 11-1 to 11-n installed for each talker. In such a case as well, the AUTOMIX 31 selects partial channels of two or more channels among audio signals of three or more channels, and controls and mixes the gains of the audio signals of selected partial channels according to the level of the audio signal of each channel.

Finally, the foregoing preferred embodiments are illustrative in all points and should not be construed to limit the present invention. The scope of the present invention is defined not by the foregoing preferred embodiment but by the following claims. Further, the scope of the present invention is intended to include all modifications within the scopes of the claims and within the meanings and scopes of equivalents.

What is claimed is:

1. An audio signal processing apparatus comprising:
a sound source direction estimator that estimates a sound source direction of each of audio signals of at least three channels;
a selector that selects a channel group of at least two channels, from among the at least three channels, according to the estimated sound source directions;
a gain controller that controls a gain of the audio signal of each channel of the selected channel group, according to a volume level of the audio signal of each channel of the selected channel group;
a plurality of microphones; and
a beam former that forms at least three sound collection beams using sound collection signals of the plurality of microphones, and outputs the at least three sound collection beams as the audio signals of at least three channels,
wherein the selected channel group does not include channels that produce sound collection beams, among the at least three sound collection beams, where sound collection directions thereof are adjacent to each other.

2. The audio signal processing apparatus according to claim 1, further comprising a mixing processor that mixes the audio signals.

3. The audio signal processing apparatus according to claim 2, wherein the mixing processor mixes the audio signal of each channel of the selected channel group that has been gain-adjusted by the gain controller.

4. The audio signal processing apparatus according to claim 1, wherein each of the at least three sound collection beams is directed to a predetermined area.

5. The audio signal processing apparatus according to claim 1, wherein the plurality of microphones are configured as a ceiling tile.

6. The audio signal processing apparatus according to claim 5, wherein the ceiling tile is configured to be replaceable.

7. The audio signal processing apparatus according to claim 1, wherein the plurality of microphones are arranged in an array in a plane.

8. An audio signal processing apparatus comprising:
a plurality of microphones;
one or more memories storing instructions; and
one or more processors that implements the instructions to:
estimate a sound source direction of audio signals of at least three channels;
select a channel group of at least two channels, from among the at least three channels, according to the estimated sound source directions;
control a gain of the audio signal of each channel of the selected channel group, according to a volume level of the audio signal of each channel of the selected channel group;
form at least three sound collection beams using sound collection signals of the plurality of microphones; and
output the at least three sound collection beams as the audio signals of at least three channels,
wherein the selected channel group does not include channels that produce sound collection beams, among the at least three sound collection beams, where sound collection directions thereof are adjacent to each other.

9. An audio signal processing method executable by one or more processors executing one or more programs stored in a memory, the method comprising:
   estimating a sound source direction of each of audio signals of at least three channels;
   selecting a channel group of at least two channels, from among the at least three channels, according to the estimated sound source directions;
   controlling a gain of the audio signal of each channel of the selected channel group, according to a volume level of the audio signal of each channel of the selected channel group;
   forming at least three sound collection beams using sound collection signals of a plurality of microphones; and
   outputting the at least three sound collection beams as the audio signals of at least three channels,
   wherein the selected channel group does not include channels that produce sound collection beams, among the at least three sound collection beams, where sound collection directions thereof are adjacent to each other.

10. The audio signal processing method according to claim 9, further comprising mixing the audio signals.

11. The audio signal processing method according to claim 10, wherein the mixing of the audio signals includes mixing the audio signal of each channel of the selected channel group that has been gain-adjusted by the controlling of the gain.

12. The audio signal processing method according to claim 9, wherein each of the at least three sound collection beams is directed to a predetermined area.

13. The audio signal processing apparatus according to claim 1, wherein the sound source direction estimator estimates the sound source direction by calculating a cross correlation of the audio signals of at least three channels.

* * * * *